No. 775,469. PATENTED NOV. 22, 1904.
P. EPPERSON.
WIRE STRETCHER.
APPLICATION FILED MAY 14, 1904.
NO MODEL.
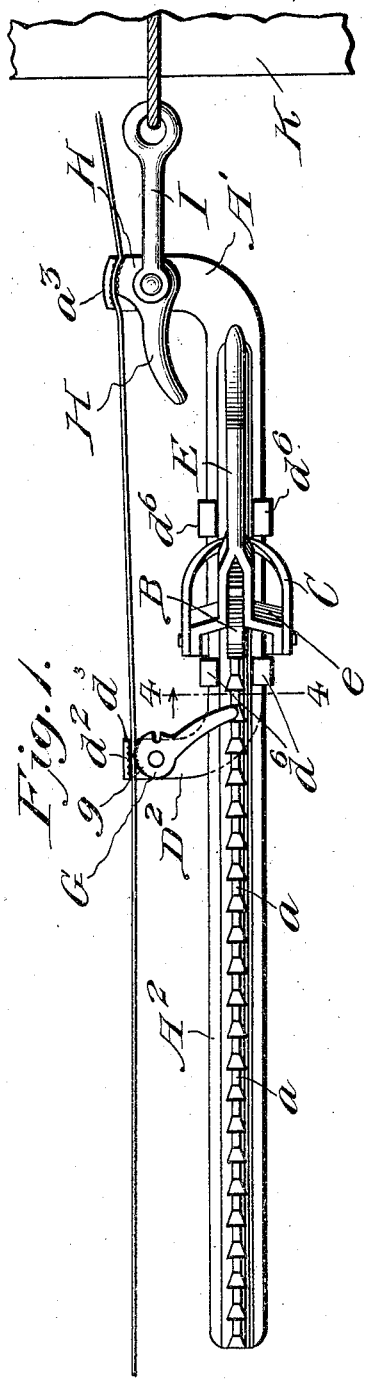
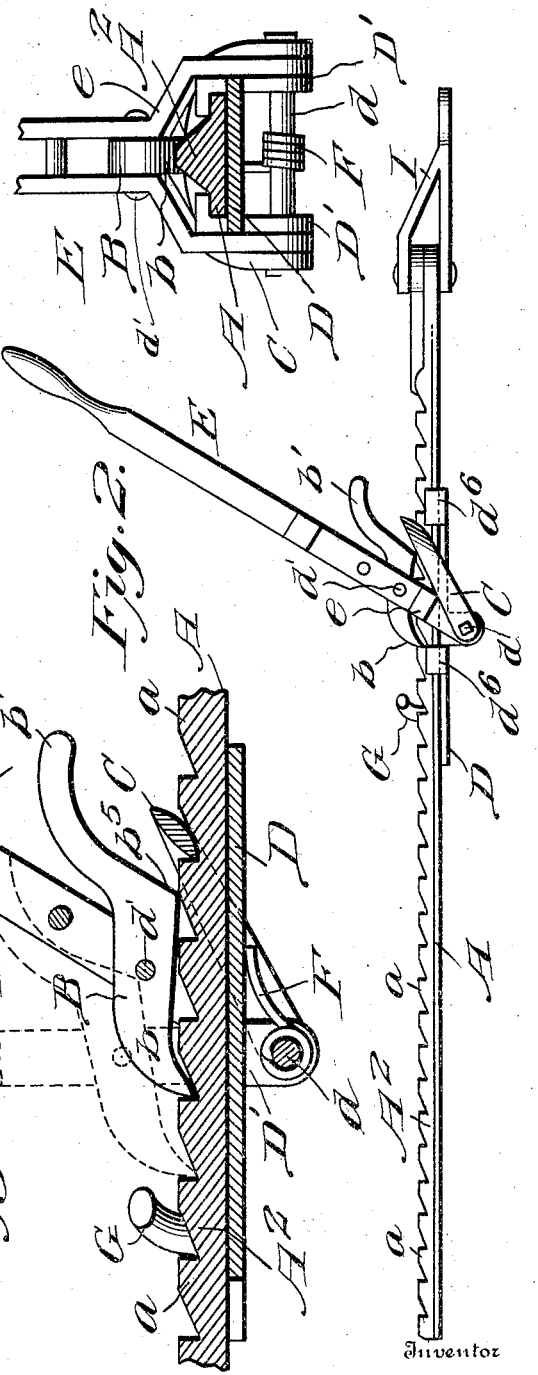
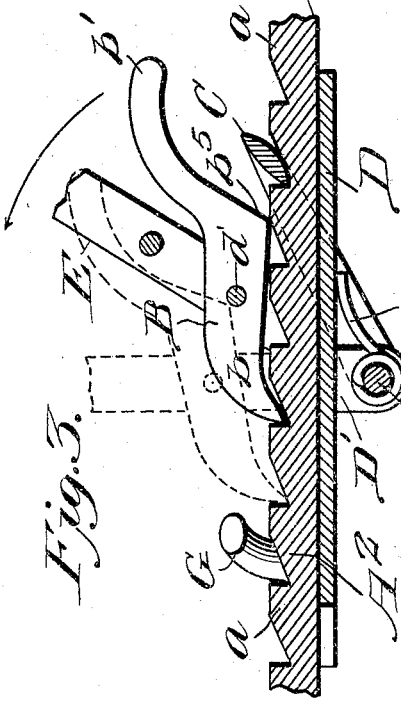
Witnesses
Edwin G. McKee
Katharine Allen
Inventor
Perrin Epperson
By Victor J. Evans
Attorney No. 775,469. Patented November 22, 1904.

UNITED STATES PATENT OFFICE.

PERRIN EPPERSON, OF BELT, MONTANA, ASSIGNOR OF ONE-HALF TO ARTHUR E. CHAMBERLAIN, OF BELT, MONTANA.

WIRE-STRETCHER.

SPECIFICATION forming part of Letters Patent No. 775,469, dated November 22, 1904.

Application filed May 14, 1904. Serial No. 208,013. (No model.)

*To all whom it may concern:*

Be it known that I, PERRIN EPPERSON, a citizen of the United States, residing at Belt, in the county of Cascade and State of Montana, have invented new and useful Improvements in Wire-Stretchers, of which the following is a specification.

This invention relates to wire-stretchers for tightening the strands of a wire fence before attaching said strands to the posts and for applying proper tension to the ends of wires which require to be spliced.

The invention consists, primarily, of a ratchet-bar, a plate slidable in relation thereto, an operating-handle pivoted to the plate and having a pawl for acting on the teeth of the ratchet-bar, whereby a wire or wires suitably attached to the device are by the movement of the handle placed under proper tension.

In the accompanying drawings, Figure 1 represents a side elevation of my improved wire-stretcher. Fig. 2 is a plan view of the same. Fig. 3 is an enlarged detail view in section of a portion of my device. Fig. 4 is a sectional view on the line 4 4 of Fig. 1.

Similar letters of reference indicate the same parts on the several figures.

A indicates a flat bar one end of which is bent upwardly at a right angle, as at A'. The main body of the bar has a central rib $A^2$ extending lengthwise thereof, the sides of which are inclined upwardly and toward each other, as shown. On the top of the rib $A^2$ are cut a series of ratchet-shaped teeth $a$, adapted to be engaged by a pawl B and a U-shaped locking-dog C.

D is a plate below the toothed bar A, to which it is slidably connected by means of lugs $d^6$, folded or bent over the edges of said toothed bar in such manner as to permit the bar A and plate D sliding one upon the other. Ears D' extend downwardly from the plate D, in which is pivoted a short shaft $d$, on the ends of which the ends of the U-shaped dog C are secured.

E indicates an operating-handle having a forked lower end which straddles the toothed bar A, the forked ends $e$ being pivoted on the short shaft $d$ between the ears D' and the ends of the dog C.

The pawl B is pivoted to the lever E by the pivot $d'$ and extends forwardly beyond said lever E, as at $b$, to engage with the teeth $a$ of the bar A and rearwardly to form a lifting-finger $b'$ and for causing the end $b$ to engage at the proper time with the toothed bar A, as will be hereinafter described. A spring F surrounds the short shaft $d$, one end being connected thereto, while its other end rests against the plate D. The object of the spring is to hold the dog C in engagement with the teeth $a$.

From the plate D a curved arm $D^2$ projects outwardly and upwardly therefrom, its upper end being turned in a forward direction to form a jaw $d^2$ and provided with a roughened or toothed surface $d^3$. A wire-grip G, pivoted to the arm $D^2$, has a roughened or toothed eccentric head $g$, which in connection with the jaw $d^2$ firmly clamps the wire to be stretched. The bent part A' of the arm A is similarly arranged, it having a roughened jaw $a^3$ and a pivoted wire-grip H. A shackle I, mounted on the pivot J, carrying the wire-grip H, is attached to a chain K, which when the device is in position is fastened around one of the fence-posts P. (See Fig. 1.)

Referring to Fig. 3, the operating-handle E and the pawl B are shown in two positions by means of full and dotted lines. The full-line position represents the handle E and pawl B as they appear when fully retracted and are about to be moved for the purpose of sliding the plate D on the bar A, as in the act of stretching two wires before splicing them. On moving the handle E in the direction indicated by the arrow to the position shown by the dotted lines the plate D will be advanced the distance of one tooth, the dog C thereon holding the plate in this position. Now on reversing the movement of the handle the point $b$ of the pawl B will disengage itself from one tooth $a$ and be forced into the next succeeding tooth by means of the heel $b^5$ on the pawl B bearing on the flattened tops of the teeth $a$.

Having thus described the invention, what is claimed is—

1. In a wire-stretcher, the combination of a plate, having an angularly-bent end provided with a wire-grip and a shackle, said plate being further provided with a second arm having a coacting grip, a ratchet-bar slidably connected to the plate, a shaft journaled upon the plate, a lever loosely mounted upon the said shaft, a locking-dog rigidly connected to the shaft and adapted to engage the teeth of the ratchet-bar, a spring connected to the shaft and bearing against the plate and regulating the action of said dog, and a pawl pivotally mounted upon the lever and provided with a heel to bear upon the ratchet-bar to positively engage the pawl with the ratchet-tooth upon the backward movement of said lever.

2. In a wire-stretcher, the combination of a ratchet-bar, a plate slidably connected thereto and provided with projecting ears, a shaft pivotally mounted in said ears, an operating-handle loosely mounted on said shaft, a locking-dog rigidly connected with the shaft, a spring connected to the shaft and bearing upon the plate to regulate the action of said dog, and a pawl pivoted to the handle and provided with a heel to bear on the ratchet-bar to positively engage the pawl with the ratchet-tooth upon the backward movement of said handle.

In testimony whereof I affix my signature in presence of two witnesses.

PERRIN EPPERSON.

Witnesses:
JAMES CHAMBERS,
W. FREDERICK PATERSON.